(12) United States Patent
Ikari et al.

(10) Patent No.: US 6,272,091 B1
(45) Date of Patent: Aug. 7, 2001

(54) RECORDING MEDIUM DEVICE EJECTION STRUCTURE AND APPARATUS BODY OR ADAPTER USED FOR THE STRUCTURE

(75) Inventors: Takeshi Ikari; Ryo Tanaka; Masahiro Kinosita; Makoto Yamaguchi, all of Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/337,674

(22) Filed: Jun. 22, 1999

(30) Foreign Application Priority Data

Jul. 1, 1998 (JP) .................................................. 10-186373

(51) Int. Cl.[7] .................................................. G11B 33/02
(52) U.S. Cl. .................................................. 369/77.1
(58) Field of Search .................................. 369/77.1, 77.2, 369/75.1, 75.2

(56) References Cited

U.S. PATENT DOCUMENTS 5,675,566 * 10/1997 Kosaka et al. ........................ 369/77.1
5,737,293 * 4/1998 Kawamura et al. ................. 369/77.1
6,052,351 * 4/2000 Yamashita et al. .................. 369/77.1

* cited by examiner

*Primary Examiner*—Allen T. Cao
(74) *Attorney, Agent, or Firm*—Ronald P. Kananen; Rader, Fishman & Grauer

(57) ABSTRACT

The present invention provides a recording medium device ejection structure which is useful to minimize the outside dimension of a recording medium device and to increase the mounting area of a printed circuit on an adapter to which the recording medium device is inserted. The recording medium device comprises a recording medium body and a case having a recess for accommodating the recording medium body, and is attached to the adapter detachably. The adapter is provided with a cover, the first lever provided on the cover, and the second lever which is in contact with the first lever at one end. The first lever gets in the recess provided on the recording medium device to resultantly push up the recording medium device, and the recording medium device is thereby ejected. A connector not shown in the drawing to which the recording medium device is inserted does not necessarily have a recording medium device ejection mechanism, and thus the product is made small-sized.

3 Claims, 8 Drawing Sheets

RECORDING MEDIUM DEVICE EJECTION STRUCTURE AND APPARATUS BODY OR ADAPTER USED FOR THE STRUCTURE

BACKGROUND OF THE INVENTION

1. Field of the Invention

This invention relates to a recording medium device ejection structure which is useful for accommodating the increased mounting area of a printed circuit board on an apparatus body or, an adapter to which a recording medium device is to be attached. The invention also relates to a compact apparatus body or adapter to which a recording medium device is to be attached.

2. Description of Related Art

Some apparatus such as personal computers and image display apparatus can detachably accept a recording medium device such as a memory stick.

Figure 8A:
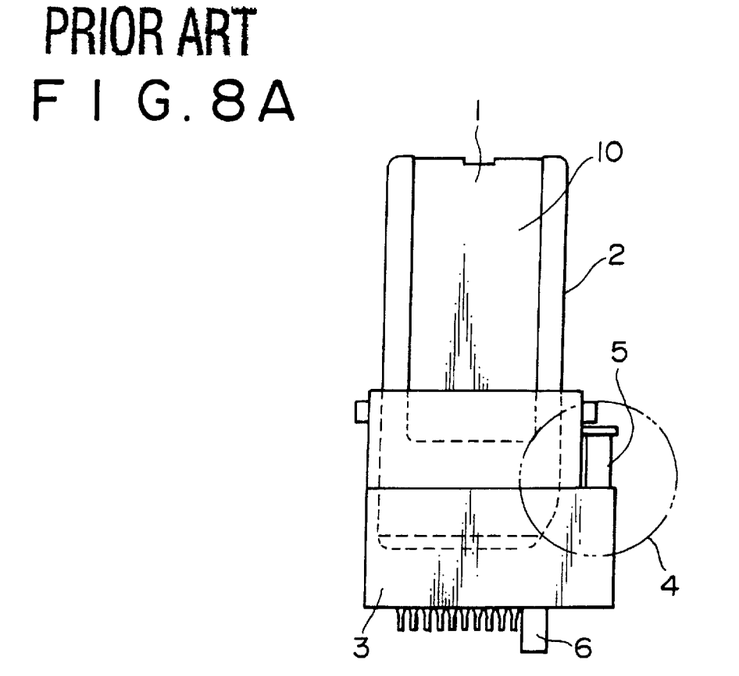
FIG. 8A and FIG. 8B are plan views for illustrating the conventional structure for ejecting a recording medium device.
Figure 8B:
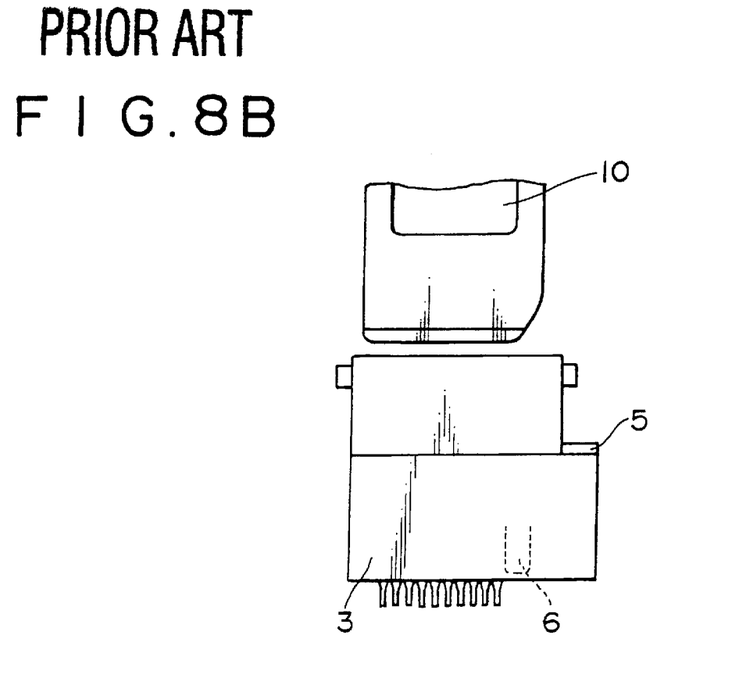

FIG. 8A and FIG. 8B are plan views for illustrating a conventional recording medium device ejection structure 10. The recording medium device 10 comprises a recording medium body 1, a case 2 in which the recording medium body 1 is accommodated, and a connector 3 for attaching the recording medium body 1 and the case 2 to an apparatus such as a personal computer or to an adapter which is to be connected to an apparatus. The connector 3 is provided with an ejection mechanism for ejecting a recording medium device 10 attached to the apparatus.

The recording medium device 10 is inserted to the connector 3 attached to, for example, an accommodation space provided in the adapter not shown in the drawing. When the recording medium device 10 is ejected, a button 5 provided on the ejection mechanism 4 is pushed manually as shown in FIG. 8B. Then, a projection 6 provided on the under side of the connector 3 moves upward. The upward motion of the projection 6 pushes up the recording medium device 10. As described herein above, the recording medium device 10 is ejected from the adapter not shown in the drawing.

The above-mentioned recording medium device ejection structure has a connector, to which a recording medium device is inserted, provided with an ejection mechanism. Therefore, a space for providing an ejection mechanism is necessary in a connector to result in a large sized outside dimension of a connector, and a connector can not be made compact. Further, in the case that a connector is attached on a printed circuit board of an adapter, the mounting area of a printed circuit board on an adapter is reduced because of the necessary space for an ejection mechanism.

The present invention is directed to overcoming the above-mentioned problem, and includes a recording medium device ejection structure which is useful for increasing the mounting area of a printed circuit board on an apparatus body or an adapter to which a recording medium device is to be attached and for compacting the size of an apparatus body or an adapter to which a recording medium device is to be attached.

SUMMARY OF THE INVENTION

To solve the above-mentioned problem, a recording medium device ejection structure in accordance with the present invention is provided with an apparatus body having an eject lever or an adapter which has also an ejection lever and is connectable to an apparatus body, and a recording medium device having a recess which is attached to the apparatus body or the adapter detachably, wherein the end of the eject lever gets in the recess of the recording medium device which is attached to the apparatus body or the adapter to push up the recording medium device, and the recording medium device is thereby ejected.

A ejection structure of a recording medium device in accordance with the present invention is provided with an apparatus body or an adapter which is connectable to an apparatus body, and a recording medium device having a recording medium body and a case which accommodates the recording medium body, where the recording medium device is attached to the apparatus body or the adapter detachably, wherein a recess is formed on a case, the rotatable first lever having a projected end is provided, where the first lever is urged by an elastic member, and a second lever which is in contact with the first lever at one end is provided, and the end of the first lever, which receives the pressing force from the second lever, gets in the recess of the recording medium device which is attached to the apparatus body or the adapter to push up the recording medium device, and the recording medium device is thereby ejected.

The first lever provided on the apparatus body or the adapter gets in the recess to push up the recording medium device, and the recording medium device is thereby ejected. Therefore, a connector which is attached to the apparatus body or the adapter so that a recording medium device is connected does not necessarily have a mechanism for ejecting a recording medium device 20 on the connector itself. As the result, the size of an adapter can be made small and compact.

Because the outside dimension of the connector can be made small, the area of a printed circuit board provided on the adapter 21 where the connector covers can be made small. In other words, the mounting area of the printed circuit board can be increased.

A recording medium device in accordance with the present invention has a recording medium body and a case for accommodating the recording medium body which are attached detachably, wherein a recess is formed on the case for ejecting the recording medium device.

An apparatus body or an adapter in accordance with the present invention is the apparatus body or the adapter which is connectable to the apparatus body, wherein the apparatus body or the adapter is provided with the rotatable first lever having a projected end, which lever is urged by an elastic member, and the second lever which is in contact with the first lever at one end.

DETAILED DESCRIPTION OF THE PREFERRED EMBODIMENTS

Figure 1:
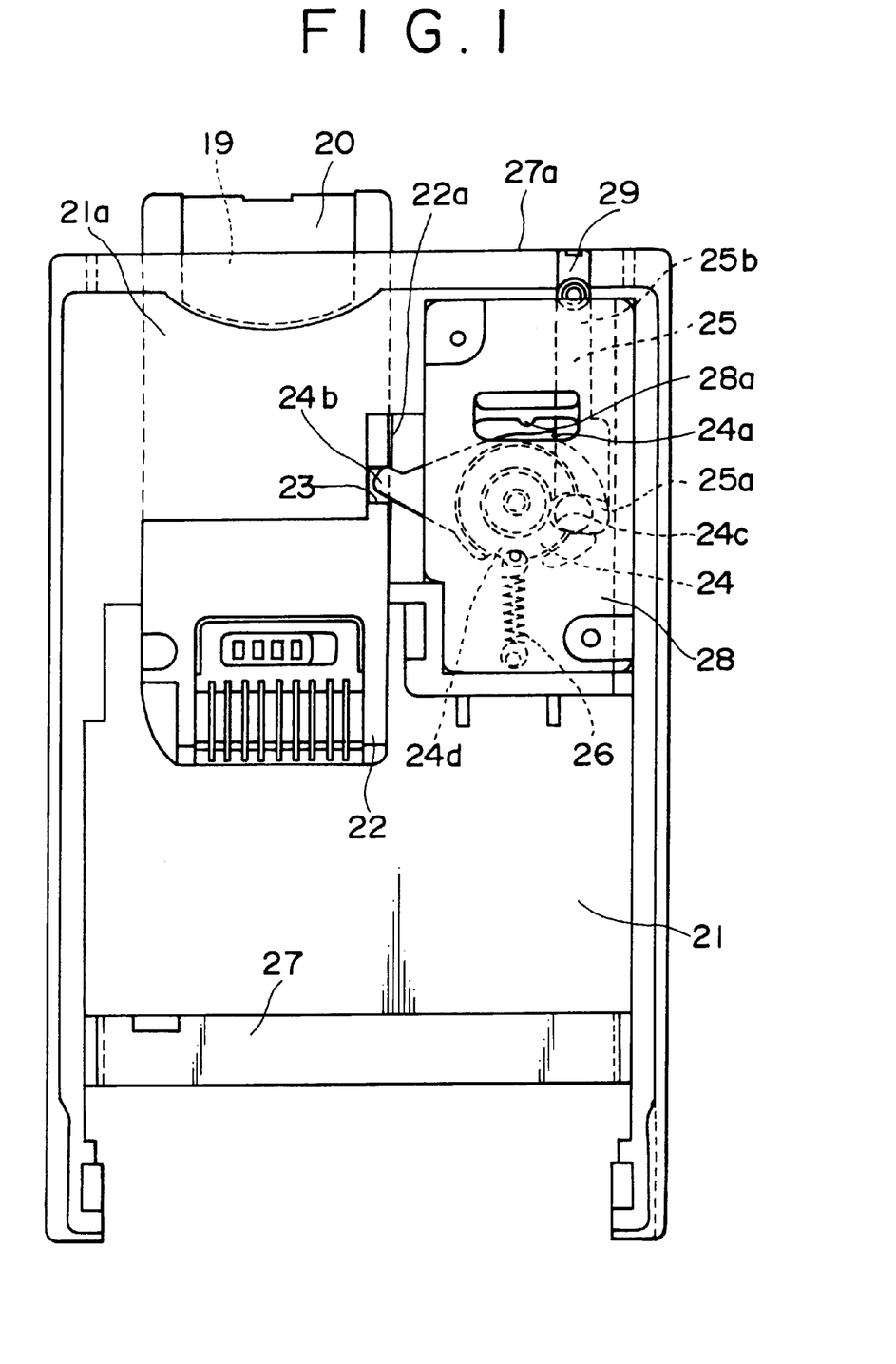
FIG. 1 is a plan view for illustrating a structure for ejecting a recording medium device 20 of the present invention.

One embodiment of the present invention will be described in detail with reference to the drawings. FIG. 1 is a plan view for illustrating a recording medium device ejection structure of the present invention. The recording medium device ejection structure comprises an adapter 21 and a recording medium device (memory stick) 20. In FIG. 1, the recording medium device 20; shown being attached to a frame of the adapter 21, and the recording medium device 20 is prepared to be ejected. The recording medium device 20 comprises a recording medium body 19 and a case 22 which accommodates the recording medium body 19. The recording medium device 20 is attached to the adapter 21 detachably. For convenience of detaching a recording medium device from the adapter 21, a recess 23 is formed on the side 22a of the case 22.

On the other hand, the adapter 21 is, for example, a card type connection adapter, and used for connecting a recording medium device 20 to an apparatus body such as a personal computer not shown in the drawing. In detail, the recording medium device 20 is inserted to an accommodation space 21a of the adapter 21, and further the adapter 21 is connected to an apparatus body such as a personal computer not shown in the drawing. The adapter 21 is provided with a cover 28, the first lever 24 located under the cover 28, and the second lever 25 having an end 25a which is in contact with the first lever 24. A projection 28a is formed on the cover 28. The projection 28a is formed of elastically deformable plastic material such as ABS resin (acrylonitrile-butadiene-styrene resin).

The first lever 24 is formed in circular disk shape as a whole. A projection 24a is formed on the periphery of the circular disk. The projection 24a can be brought into contact with the projection 28a of the cover 28. Further, the end 24b of the first lever 24 extends in the form a of projection. When the recording medium device 20 is on the way to be ejected from the adapter 21 as shown in FIG. 1, the end 24b gets into the recess 23 of the recording medium device 20. The bottom 24d of the circular disk of the first lever 24 is urged by, for example, a spring 26. Further, the circular disk of the first lever 24 is provided with a recess 24c. The first lever 24 is brought into contact with the end 25a of the second lever 25 at the recess 24c. In detail, the second lever 25 is rod shaped, and the one end 25a gets into the recess 24c of the first lever 24 to be brought into contact with the first lever 24.

The other end 25b of the second lever 25 extends to the end face 27a of a frame 27 which is a component of the periphery of the adapter 21. A button 29 is formed on the end of the other end 25b. The button 29 is formed in the present embodiment, but the button 29 is not necessarily formed.

Figure 2:
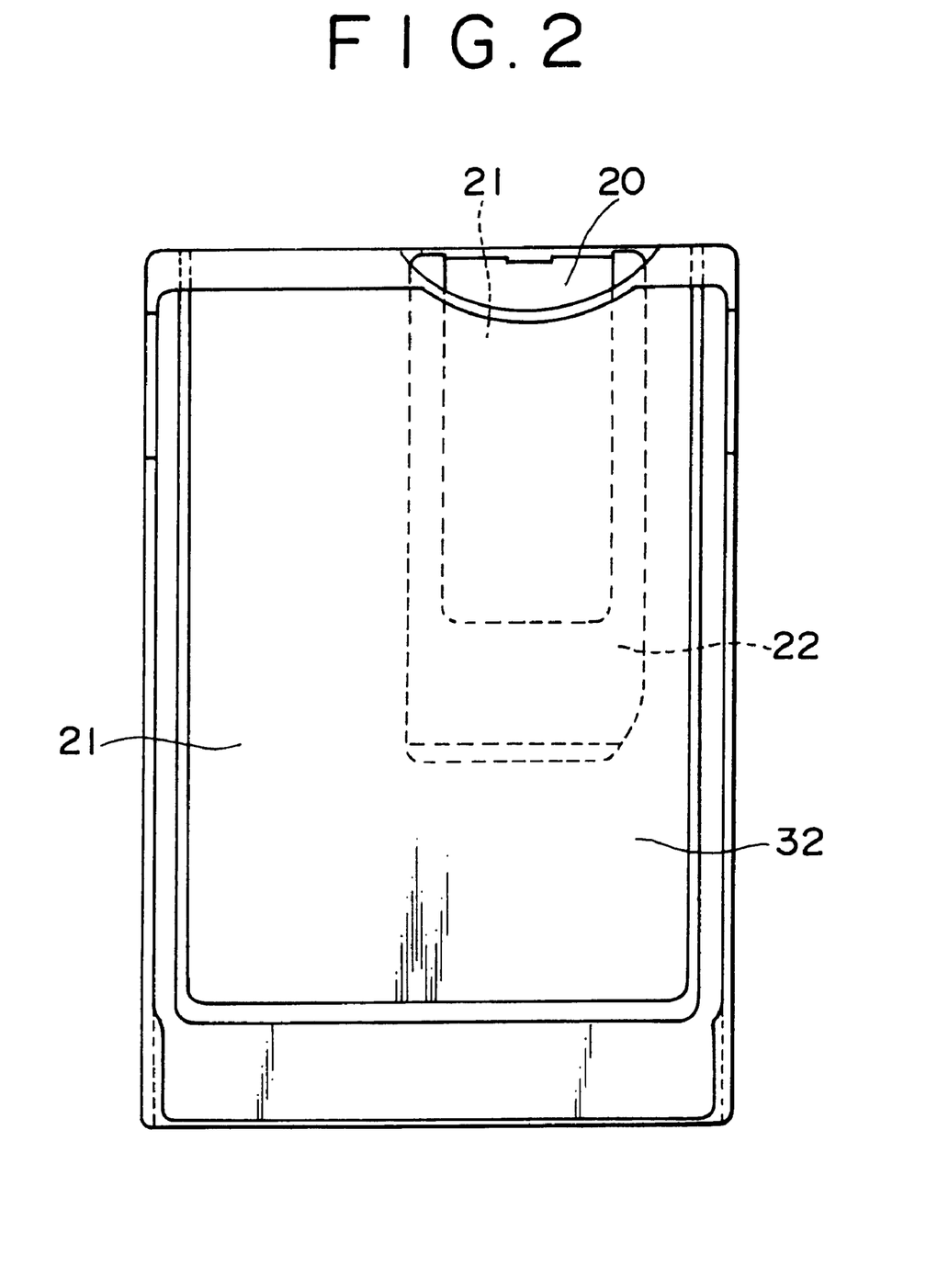
FIG. 2 is a back side plan view of an adapter 21 to which the recording medium device 20 is attached.

FIG. 2 is a back side plan view of the adapter 21 shown in FIG. 1, to which a recording medium device 20 is attached. In FIG. 2, the adapter 21 is covered with, for example, a metal cover 32 on the frame 27.

Next, the operation for ejecting a recording medium device 20 from the adapter 21 is described.

Figure 3:
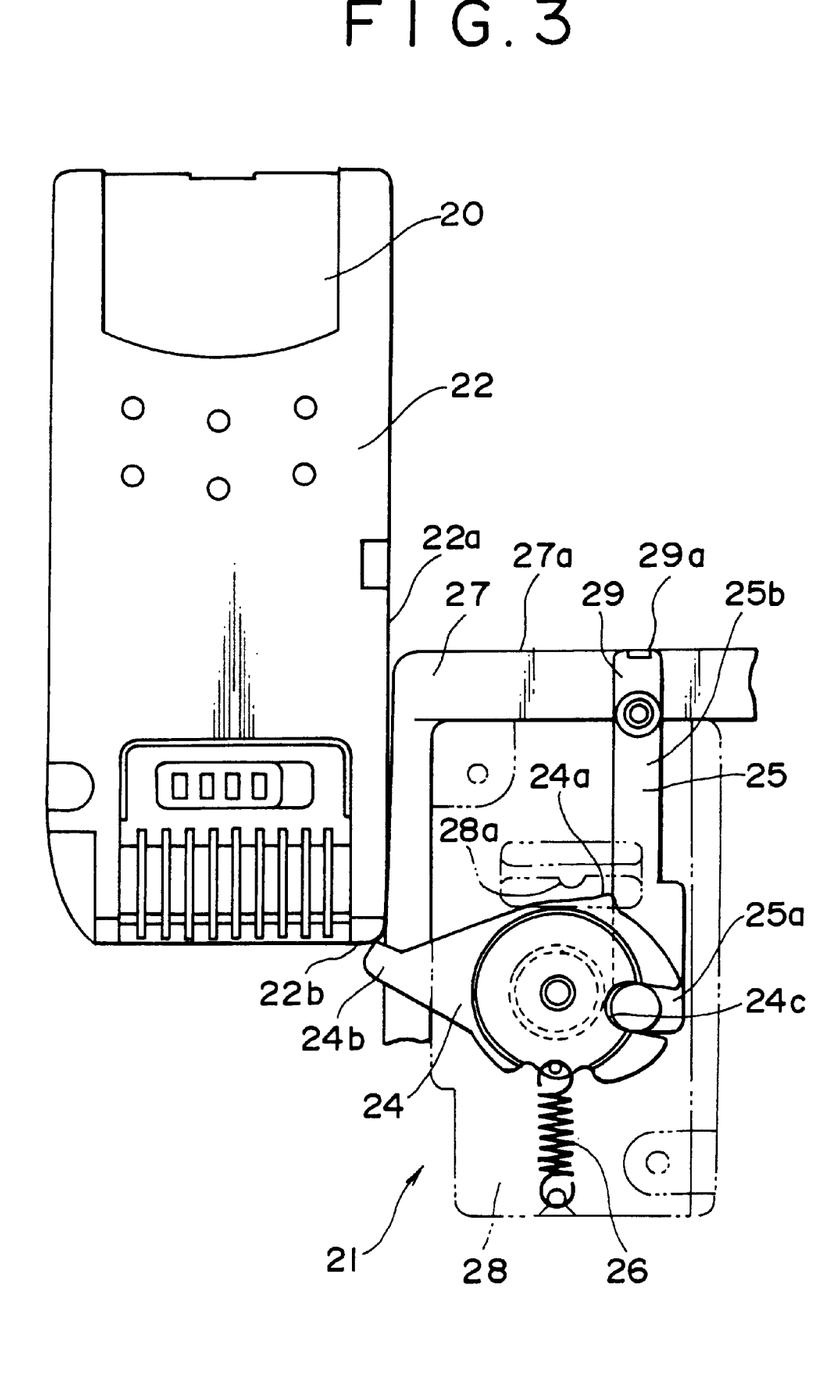
FIG. 3 is a plan view for illustrating the operation for ejecting the recording medium device 20.

FIG. 3 shows a recording medium device 20, which begins just to be inserted into the adapter 21. At that condition, the end 24b of the first lever 24 is in contact with the bottom end 22b of the side 22a of the recording medium device 20. The first lever 24 remains at the predetermined position (the condition is referred to as "initial position" hereinafter) as shown in the drawing with aid of the urging force of the spring 26. In the condition of this initial position, the end 24b of the first lever 24 is directed slightly upward from the lateral direction, and positioned at the location where the end 24b is located outside the cover 28. At that time, the spring 26 is located in parallel in the vertical direction. In the condition of this initial position, the projection 24a of the first lever 24 is located on the right side of the projection 28a of the cover 28 on the drawing. The top end 29a of the button 29 provided on the second lever 25 which is in contact with the first lever 24 is located at the same level of the end face 27a of the frame 27.

Figure 4:
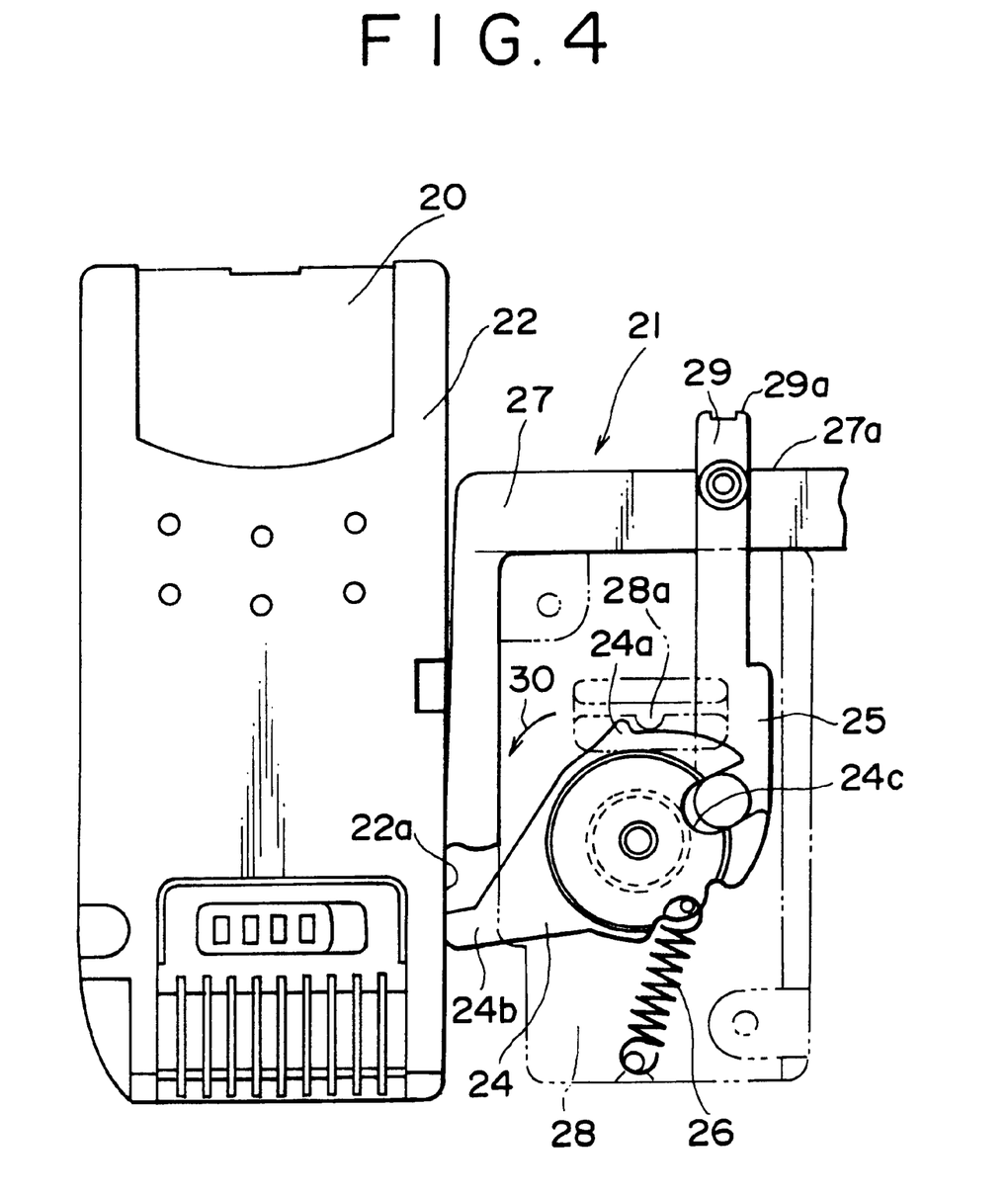
FIG. 4 is a plan view for illustrating the operation for ejecting the recording medium device 20.

Next, as shown in FIG. 4, the recording medium device 20 is inserted into the adapter 21. As the recording medium device 20 is inserted deeper, the end 24b of the first lever 24 slides along the side face 22a of the case 22 and is drawn down. As the result, the first lever 24 rotates in the direction shown with an arrow 30. Correspondingly to the rotation of the first lever 24, the projection 24a is rotated in the direction shown with the arrow 30 and brought into contact with the projection 28a of the case 28 to further push down the projection 28a. The projection 28a is elastically deformed by the pressing force. As the result, the projection 24a of the first lever 24 which has been located on the right side of the projection 28a is moved to the left side over the projection 28a which is being pressed and deformed.

At the same time, the recess 24c of the first lever 24 is rotated in the direction of the arrow 30, and the second lever 25 which has been in contact with the recess 24c is moved to the upper position than the initial position. As the result, the top end 29a of the button 29 comes out or extends beyond the end face 27a of the frame 27.

Figure 5:
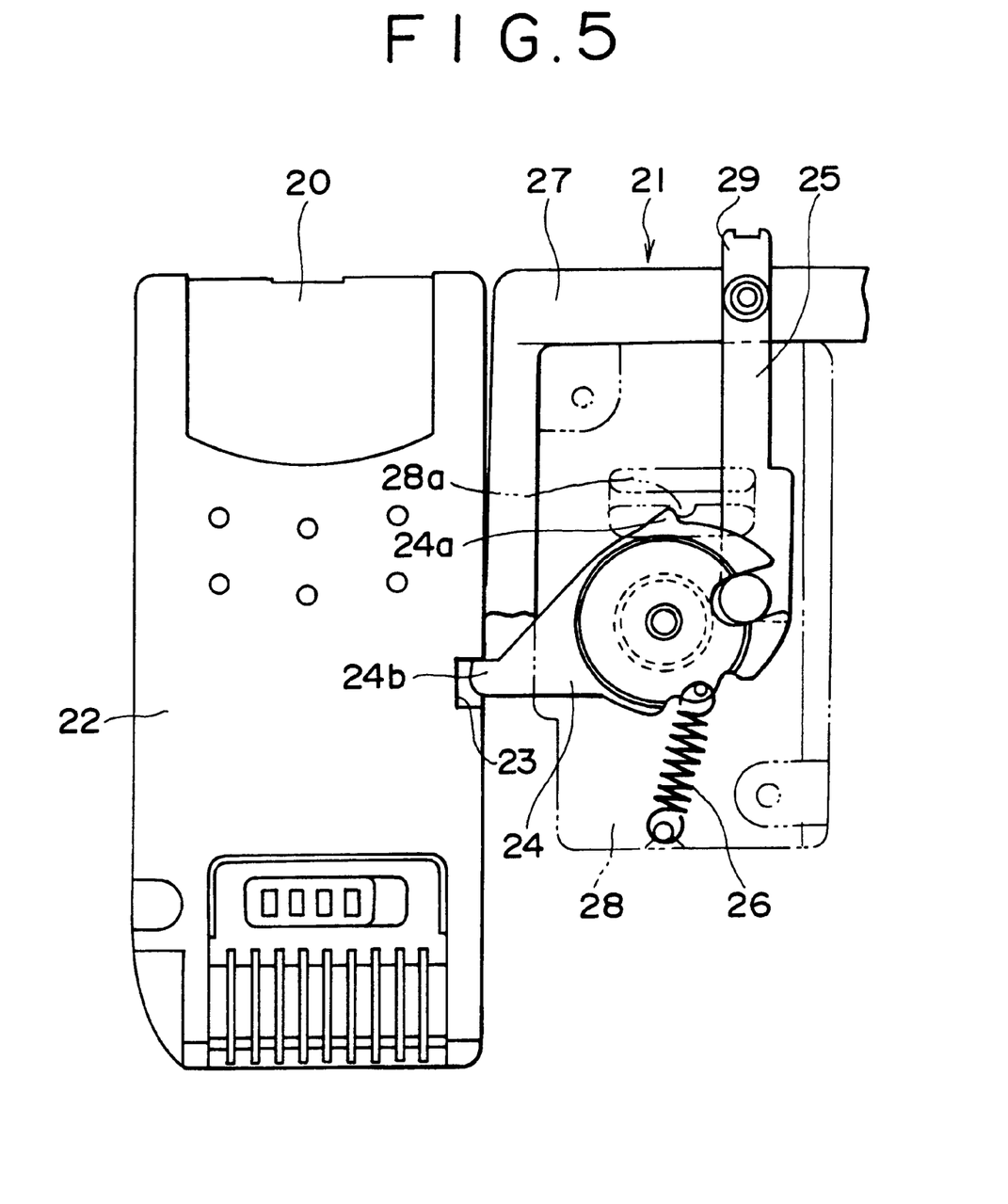
FIG. 5 is a plan view for illustrating the operation for ejecting the recording medium device 20.

As shown in FIG. 5, when the recording medium device 20 is attached to the adapter 21, the urging force of the spring 26 draws back the first lever 24, the end 24b of which first lever 24 has been drawn down. Correspondingly, the end 24b is lifted up again. At that time, since the projection 24a of the first lever 24 is brought into contact with the projection 28a, the force which functions to draw back the first lever 24 to the initial position is restricted. As the result, the end 24b of the first lever 24 gets into the recess 23 provided on the case 22 of the recording medium device 20.

Figure 6:
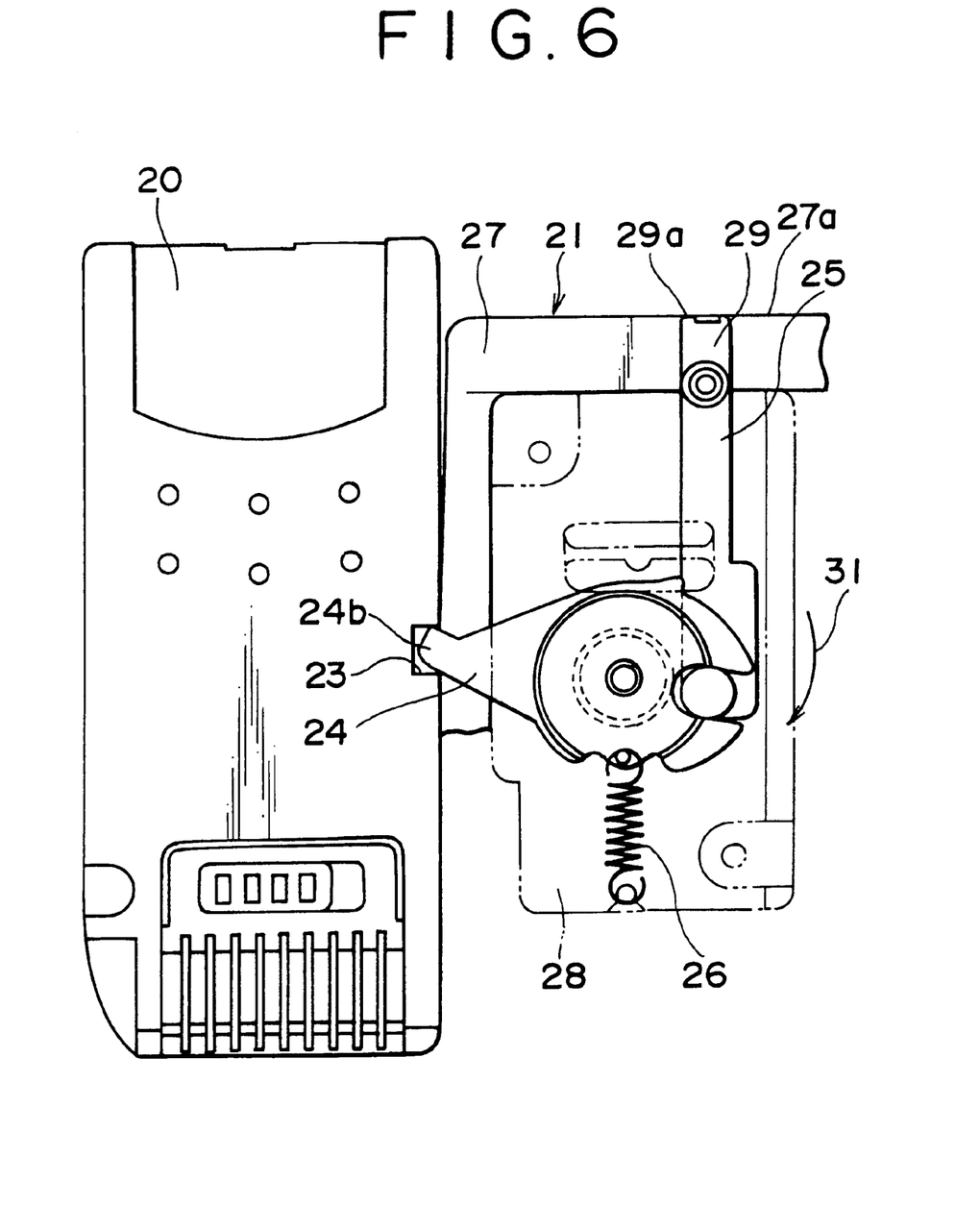
FIG. 6 is a plan view for illustrating the operation for ejecting the recording medium device 20.

When the recording medium device 20 is ejected from the adapter 21, the button 29 is pushed so that the top end 29a of the button 29 is positioned at the same height as the end 27a of the frame 27 as shown in FIG. 6. At that time, the second lever 25 is moved downward, and the first lever 24 which is in contact with the second lever 25 is rotated in the direction shown with an arrow 31. The end 24b of the first lever 24 is lifted concomitantly upward, and the end 24b pushes up the recording medium device 20. A portion of the pushed up recording medium device 20 comes out beyond the position of the frame 27 of the adapter 21. In this condition, the end 24b of the first lever 24 remains yet in the recess 23 of the recording medium device 20.

Figure 7:
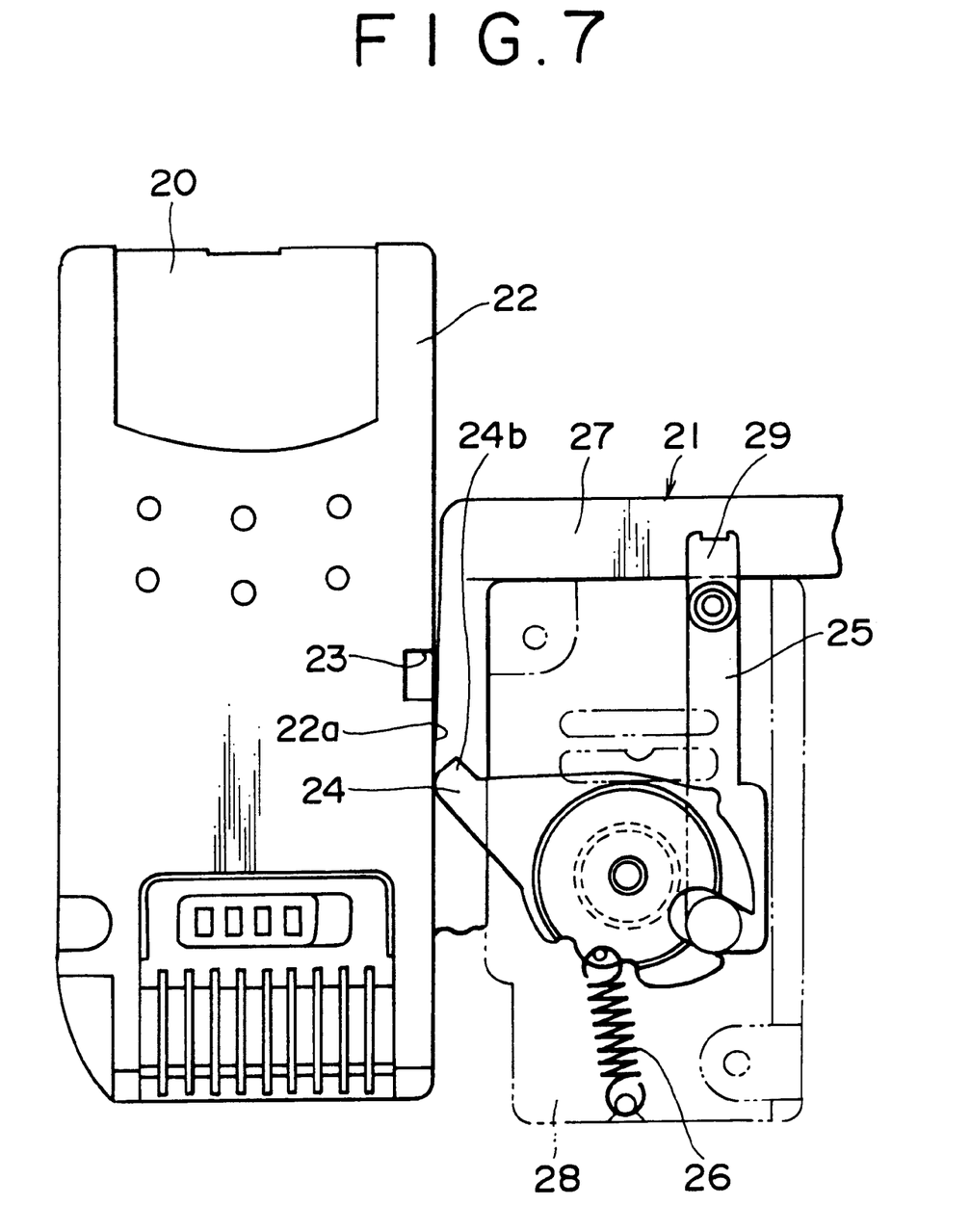
FIG. 7 is a plan view for illustrating the operation for ejecting the recording medium device 20.

As shown in FIG. 7, the exposed recording medium device 20 is drawn out with a hand not shown in the drawing. At that time, the end 24b of the first lever 24 comes out from the recess 23 of the recording medium device 20, and slides along the side face 22a of the case 22. When the recording medium device 20 is drawn out completely from the adapter 21, the first lever 24 returns to the initial position as shown in FIG. 3 with aid of the urging force of the spring 26.

According to the above-mentioned embodiment, the first lever 24 provided to the adapter 21 get into the recess 23 provided on the recording medium device 20 to resultantly push up the recording medium device 20, and the recording medium device 20 is thereby ejected. Therefore, a connector not shown in the drawing, to which a recording medium device is inserted, does not necessarily have a mechanism for ejecting a recording medium device 20 on the connector itself. As the result, the size of an adapter can be made small and compact.

Because the outside dimension of the connector not shown in the drawing can be made small, the area of a printed circuit board provided on the adapter 21 where the connector covers can be made small. In other words, the mounting area of the printed circuit board can be increased.

A recording medium device and adapter 21 which has an ejection mechanism of the present invention is connected to, for example, a personal computer or an image display apparatus. Thus a new product having a novel ejection mechanism which has been not available heretofore can be provided.

In the above-mentioned embodiment, the projection 28*a* of the cover 28 is formed of elastically deformable material, however another method in which the whole member having the projection 28*a* is pressed by a spring or rubber member and moved by the urging force of the spring or rubber member may be used.

The PC (personal computer) card adapter, which is a conversion adapter for connecting to a personal computer, is used as the adapter 21, however the present invention may be used for an adapter for a computer game.

Further the recording medium device 20 may be attached directly to an apparatus body such as a game machine.

In this case, a mechanism for taking out the recording medium device 20 provided to the adapter 21 in the present embodiment is provided to such an apparatus.

The spring 26 is used as the elastic member provided to the adapter 21, however otherwise any member may be used as long as the member is a member capable of exerting an urging force such as a rubber member.

As described herein above, according to the present invention, the outside dimension of a connector is made small to result in compact products such as an apparatus body or an adapter to which a recording medium device is to be attached, and the mounting area of a printed circuit board on the apparatus body or the adapter to which the recording medium device is to be attached is increased.

What is claimed is:

1. A memory device ejection structure comprising:

an apparatus body having an eject lever, or, an adapter which has an eject lever and is connectable to an apparatus body:

a button for ejecting said memory device, said button being drivingly connected to said eject lever and extending beyond a face of said apparatus body or said adapter when said memory device is inserted to a predetermined position of said apparatus body or said adapter; and a memory device having a recess which is attached to said apparatus body or said adapter detachably and a connecting portion for connecting a connector of said apparatus body or said adapter;

wherein an end of said eject lever enters said recess of said memory device which is attached to said apparatus body or said adapter to push up said memory device, and said memory device is thereby rejected.

2. An ejection structure of a memory device comprising:

an apparatus body, or, an adapter which is connectable to an apparatus body:

a button for ejecting said memory device, said button extending beyond a face of said apparatus body or said adapter when said memory device is inserted to a predetermined position of said apparatus body or said adapter; and a memory device having a memory, a case which accommodates said memory and a connecting portion for connecting a connector of said apparatus body or said adapter, said memory device being attached to said apparatus body or said adapter detachably, wherein:

a recess is formed on said case, a rotatable first lever is provided having a projected end, wherein said first lever is urged by an elastic member, and a second lever, which is in contact with said first lever at one end and forming said button at another end, is provided, and the end of said first lever, which receives a pressing force from said second lever, enters said recess of said memory device which is attached to said apparatus body or said adaptor to push up said memory device, and said memory device is thereby ejected.

3. An apparatus body or an adapter which is connectable to an apparatus body, wherein said apparatus body or said adapter comprises:

an accommodation space for accommodating a memory device having a recess and a connecting portion;

a button for electing said memory device, said button being coming out beyond a face of said apparatus body or said adapter when said memory device is inserted to a predetermined position of said apparatus body or said adapter;

a connector for connecting said connecting portion of said memory device; and an eject lever drivingly connecting to said button, wherein an end of said eject lever enters said recess of said memory device which is attached to said apparatus body or said push up said memory device, and said memory device is thereby ejected.

* * * * *